United States Patent
Solinas et al.

(10) Patent No.: US 9,218,222 B2
(45) Date of Patent: Dec. 22, 2015

(54) PHYSICAL MANAGER OF SYNCHRONIZATION BARRIER BETWEEN MULTIPLE PROCESSES

(75) Inventors: Angelo Solinas, Paris (FR); Jordan Chicheportiche, Paris (FR); Saïd Derradji, Issy-les-Moulineaux (FR); Jean-Jacques Pairault, Boulogne (FR); Zoltan Menyhart, Saint-Martin d'Heres (FR); Sylvain Jeaugey, Meylan (FR); Philippe Couvee, Villard Bonnot (FR)

(73) Assignee: BULL SAS, Les Clayes-Sous-Bois (FR)

( * ) Notice: Subject to any disclaimer, the term of this patent is extended or adjusted under 35 U.S.C. 154(b) by 1001 days.

(21) Appl. No.: 13/139,989

(22) PCT Filed: Nov. 27, 2009

(86) PCT No.: PCT/FR2009/052322
§ 371 (c)(1),
(2), (4) Date: Jun. 15, 2011

(87) PCT Pub. No.: WO2010/070222
PCT Pub. Date: Jun. 24, 2010

(65) Prior Publication Data
US 2011/0252264 A1    Oct. 13, 2011

(30) Foreign Application Priority Data

Dec. 16, 2008    (FR) .................................... 08 07089

(51) Int. Cl.
*G06F 9/46* (2006.01)
*G06F 9/52* (2006.01)
(52) U.S. Cl.
CPC . *G06F 9/52* (2013.01); *G06F 9/522* (2013.01)

(58) Field of Classification Search
None
See application file for complete search history.

(56) References Cited

U.S. PATENT DOCUMENTS

| 6,766,437 | B1 * | 7/2004 | Coscarella .......... G06F 9/30087 712/20 |
| 7,100,021 | B1 * | 8/2006 | Marshall et al. ................ 712/19 |
| 2006/0212868 | A1 * | 9/2006 | Takayama et al. ............ 718/100 |
| 2006/0225074 | A1 * | 10/2006 | Vaid et al. ..................... 718/102 |
| 2007/0113233 | A1 | 5/2007 | Collard et al. |
| 2008/0077912 | A1 * | 3/2008 | Zhang ............................ 717/151 |
| 2008/0109604 | A1 * | 5/2008 | Reilly et al. .................. 711/118 |

(Continued)

OTHER PUBLICATIONS

Sampson et al., "Fast Synchronization for Chip Multiprocessors", ACM SIGARCH Computer Architecture News, vol. 33, No. 4, 2005, pp. 1-6, XP-002417542.

(Continued)

*Primary Examiner* — Abdullah Al Kawsar
(74) *Attorney, Agent, or Firm* — Pillsbury Winthrop Shaw Pittman LLP (57) ABSTRACT

A computer device with synchronization barrier including a memory and a processing unit capable of multiprocess processing on various processors and enabling the parallel execution of blocks by processes, the blocks being associated by groups in successive work steps. The device further includes a hardware circuit with a usable address space to the memory, capable of receiving a call from each process indicating the end of execution of a current block, each call comprising data. The hardware circuit is arranged to authorize the execution of blocks of a later work step when all the blocks of the current work step have been executed. The accessibility to the address space is achieved by segments drawn from the data of each call.

15 Claims, 6 Drawing Sheets

(56) References Cited

U.S. PATENT DOCUMENTS

2008/0229011 A1* 9/2008 Yamazaki et al. ............ 711/113
2011/0087860 A1* 4/2011 Nickolls et al. ................ 712/22

OTHER PUBLICATIONS

Cohen et al., "Dynamic Barrier Architecture for Multi-Mode Fine-Grain Parallelism Using Conventional Processors", downloaded from the Internet, 1994, pp. 1-23 XP-002533890.

* cited by examiner

PHYSICAL MANAGER OF SYNCHRONIZATION BARRIER BETWEEN MULTIPLE PROCESSES

BACKGROUND OF THE INVENTION

The present invention relates to the processing of processes executed in parallel.

Some software packages or computer programs take much time to execute or accomplish a given task. To be more efficient and reduce the computation times, these programs can take advantage of the parallel nature of the computer on which they are executed. "Parallel nature of a computer" is understood to mean a computer on which several processors, or at least a processor with several cores, or at least a processor with several threads are mounted.

To make the most of the parallel nature, a computer program divides its task (or main task) into several sub-tasks, whose calculations can be made in parallel by various processes. Therefore, the purpose of each process will be to execute and accomplish one of these sub-tasks. Once a process has ended its current sub-task, it will be possible to assign a second sub-task to be accomplished to it after which a following sub-task will be possibly assigned to it and so forth.

The use of a multitude of processes (multiprocess processing) entails a synchronization need of the latter. In particular, the purpose of this synchronization is to enable a well-ordered re-organization of the main task when the sub-tasks have been accomplished.

Such a synchronization is generally ensured by a mechanism, called "inter-process synchronization mechanism". This mechanism must be fast in order not to cancel the temporal advantage drawn from the use of processes executed in parallel.

To perform the aforementioned synchronization, a software nature mechanism called "barrier mechanism" is known. This mechanism can be based on various algorithms which follow the same main scheme described hereafter.

Firstly, a computer program intended to accomplish a task is executed via n processes, themselves being capable of executing a set of sub-tasks. Each sub-task is divided into successive blocks intended to accomplish work steps, such as an intermediate computation, for example. So, the blocks or intermediate computations of the various processes are executed in parallel. Each process having completed a block waits at the level of a barrier (synchronization barrier) until all the other parallel blocks of the other processes are completed and have joined the barrier in turn. Only once all the processes have reached the barrier are the following blocks executed during the next work step. This principle is described hereafter using a temporal diagram.

Figure 1:
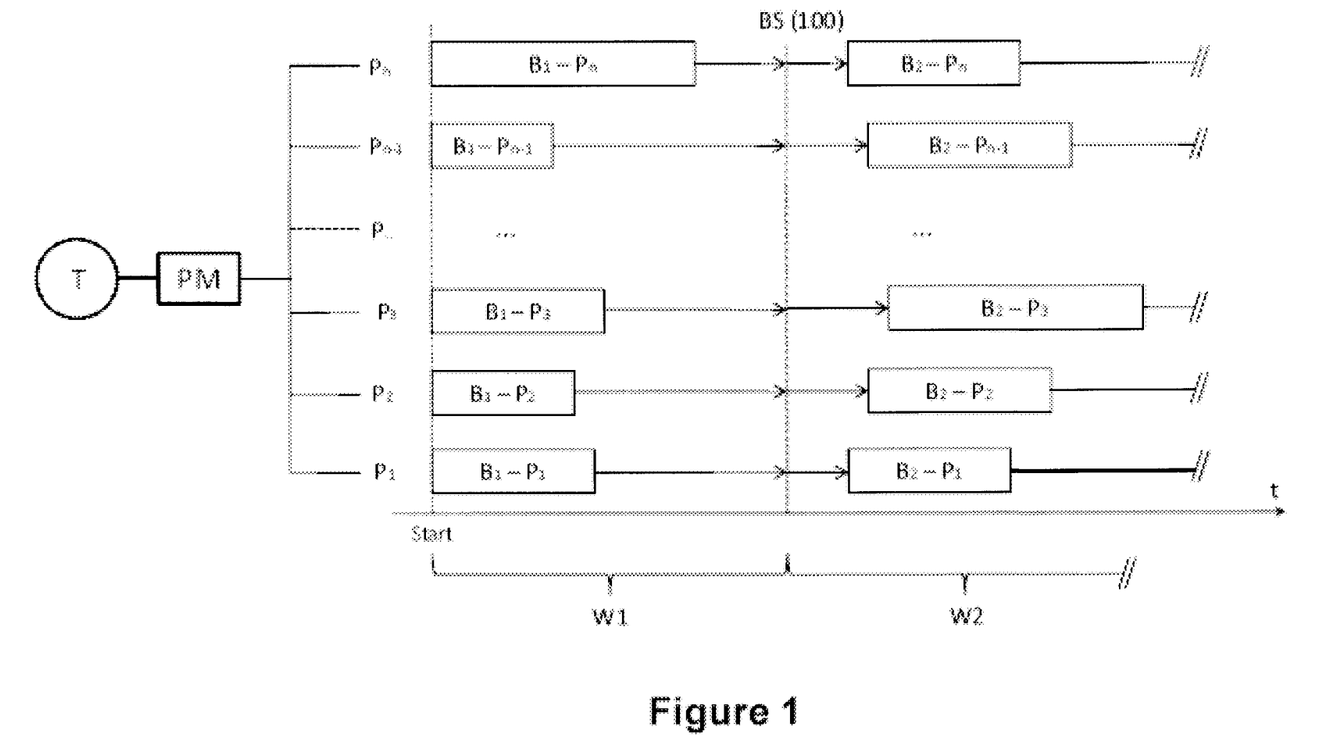
FIG. 1 is a temporal diagram which illustrates the general operation of a barrier mechanism.

FIG. 1 shows a barrier mechanism and thus the general operation of a synchronization barrier. Starting from a main task T, a process manager PM will firstly break down the task T, into n sub-tasks ST. These n sub-tasks ST will be executed by n processes P. In other words, the complex main task T is broken down into several simple sub-tasks ST, each of these sub-tasks being accomplished by a separate process.

The results obtained of the various sub-tasks ST executed by the processes P will be collected in the end to accomplish the main task T.

Let us notice that the concept of process manager PM is to be understood in the general sense. Hence, the manager PM is not necessarily an element of its own. Indeed, the process manager can generally be seen as the capacity of a computer program to implement a passive or active breakdown method to enable the processes to share the sub-tasks out between themselves. The capacity can be implicit, determined by one of the processes, or correspond to a breakdown predefined by a user.

As mentioned above, during the breakdown of a task into a multitude of processes $P_j$, there is a synchronization need in the parallel execution of these various processes. For this purpose, the n processes are themselves divided into blocks B, which must be executed successively in time. The sub-set of blocks B which are being executed at the same time (and originate from various processes P) constitutes a work step W. Consequently, each set of blocks B of the same rank i constitutes a distinct work step W.

The blocks $B_i$ of the work step of rank i, noted $W_i$ are executed in parallel. The time t for execution of blocks B originating from various processes $P_j$ is variable. To ensure the synchronization mentioned above, the blocks B are subjected to a synchronization barrier BS (100). This barrier BS (100) is called by each process P when it has finished executing its block $B_i$ in progress. The synchronization barrier BS (100) authorizes changeover to the block $B_{i+1}$ of the next rank, only when all the blocks $B_i$ in progress have "joined" the barrier, i.e. informed it that their execution is completed.

The first completed block B, i.e. that with the shortest execution time t, informs by request the synchronization barrier BS (100) that it has finished its work, on the one hand, and of the number of remaining blocks in progress during the same work step, on the other hand. Generally, the number of blocks during a work step is equivalent to the number n of processes P.

The synchronization barriers are usually fitted with a counter. The counter is initialized when the first block B has joined the barrier. Subsequently, the counter is decremented whenever another block B joins the barrier BS (100). So, the barrier BS (100) can follow the progress (or advance) of a work step, and more precisely the termination of each block B in progress. When the last block B, namely that with the highest execution time t has joined the barrier BS (100), the latter informs each process P and authorizes them to transit to the next work step W. Again, this following work step W consists of blocks B executed in parallel and originating from the various processes P. During this following work step, the mechanism of the barrier BS (100) is analogous to the preceding one. This is repeated for each work step, and continues until the processes P terminate. The task T will then be accomplished by restoring the results of the processes P.

Such algorithms require a number of interactions between the processes, blocks and barrier. These interactions will be described later in the detailed description and comprise the barrier initialization, the information given to the barrier when a block has finished its work, the verification that all the sub-processes have terminated their current block, in particular. These interactions, when they are managed by barriers of a software nature, are relatively slow and greatly consume passband.

Figure 2:
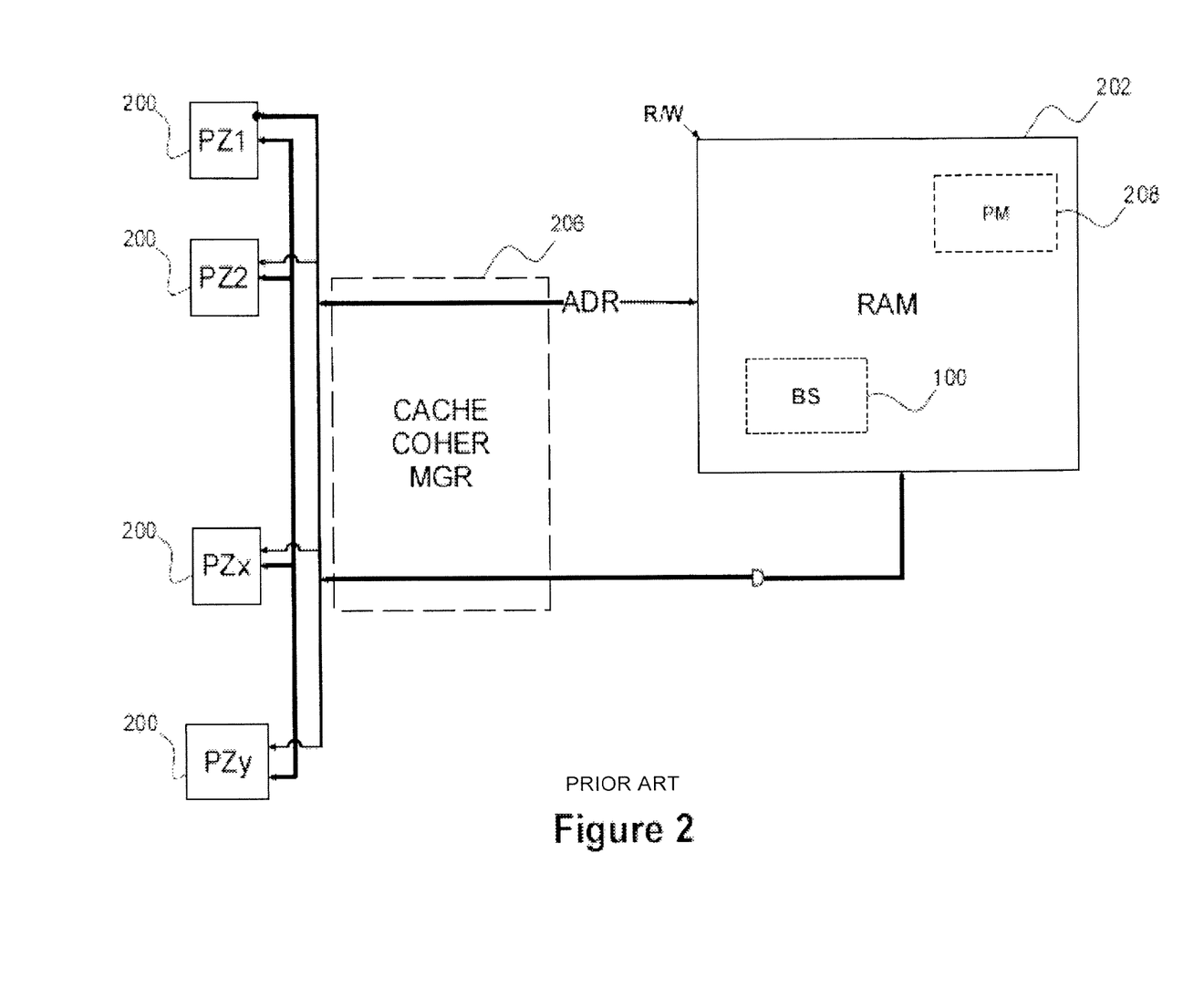
FIG. 2 is the block diagram of an implementation of a software synchronization barrier of the prior art.

FIG. 2 relating to the prior art represents an implementation of a known synchronization barrier BS (100). The known mechanisms are implemented in software packages. So, the data defining the synchronization barrier BS (100) are stored in the RAM (202) (Random Access Memory) of a computer (or other computer device) and the various processes P have access (by read/write R/W) to this RAM (202) to interact with said barrier BS (100). This access is done by means of an address space and an ADR address (detailed further on). The access comprises, such as described above, the initialization of the barrier BS (100) (with the counter initialization), informing the barrier BS (100) whenever a block B has finished its work during the same work step W, check whether all the processes P have finished their block B of the work step W in progress, etc. The program intended to carry out these functions is also active in random access memory, in particular by calling a function library.

An address space can be segmented into independent segments. "Segment" is understood to mean in general a memory segment defined by two values:
the address where this segment begins (basic address), and the segment size.

Therefore, a segment constitutes a continuous address range in a main memory (physical or virtual).

FIG. 2 shows a computer device comprising several processors $PZ_1$ to $PZ_y$, (200), a memory access manager CACHE COHER MGR (206), a RAM (202) containing a program area in which the synchronization barrier BS (100) of a software nature is. The device according to FIG. 2 therefore comprises a processing unit capable of multi-process processing operations. The processes will then be executed on various processors, on various cores of processors, and/or on various threads. The processing unit gives to these processors what is called an "address space", in particular to the random access memory, where the code and the data which define the software synchronization barrier BS (100) are, in an area associated with a precise ADR address, which can be the area beginning address. The device of FIG. 2 further comprises a process manager (208) of the type as defined above to break down a task T inton processes P, themselves divided into successive B blocks.

The barriers of the prior art (FIG. 2) enable the implementation of a synchronization between various processes P. But, as already mentioned, the software nature of a barrier makes it slow with respect to some needs. Indeed, whenever a process P interacts with it, a functions library of the barrier BS (100) is used. In addition, within the library, many interactions with the memory are necessary to read and write the barrier updating data until the detection of the fact that all the processes have reached the meeting place ("synchronization barrier). Then, once the process P has informed the barrier BS (100), the process P must regularly interrogate the barrier BS (100) to see if the other current blocks B have finished their work.

All this, and particularly the numerous interactions mentioned above, entails that the synchronization barriers BS (100) of a software nature are slow and consume passband. The effect of this are losses of clock cycles, which is all the more regrettable that the multi-process mode is used to go faster.

In addition, it may happen that various blocks belonging to distinct respective processes inform the barrier at the same time; whence memory access conflicts generating additional latency and passband problems (conflict management by CACHE COHER MGR).

The present invention improves the situation.

SUMMARY OF THE INVENTION

For this purpose, the invention introduces a computer device with synchronization barrier, comprising a memory, a processing unit, capable of multiprocess processing on various processors and enabling parallel execution of blocks by processes, said blocks being associated by group in successive work steps, and a hardware circuit with a usable address space to the memory, capable of receiving a call from each process indicating the end of execution of a current block, each call comprising data, and said hardware circuit being arranged to authorize the execution of blocks of a later work step when all the blocks of the current work step have been executed, of which the address space is accessed by segments drawn from said data of each call.

In an embodiment, the hardware circuit of the device comprises a microprogram to perform a processing drawn from the data of at least a call. In this case, the processing can, in particular, comprise the suspension of responses to each call, until an end condition indicating that all the processes have signalled the end of execution of the block of the current work step is verified. Once the end condition is verified, namely when all the processes have signalled the end of execution of the current work step block, the hardware circuit can respond to each call by a data output, and authorize the processes to transit to the later work step.

In another embodiment, the processing mentioned above comprises the extraction of the number of processes from a first call, then the countdown on this number from other calls, until the end condition is checked. It must be noted that each call can indicate this number of processes.

Also, the present invention introduces a computer processing process at the process level of the type comprising the following steps:
a. break down a task into sub-tasks executed as processes composed of successive blocks;
b. provide a synchronization barrier with a counter related to the number of processes in a barrier physical manager;
c. in each process, define a first block as the current block and execute it, while having access to said synchronization barrier to decrement said counter when the execution of this current block ends;
d. in each process where the execution of the current block is ended, wait for a response of said synchronization barrier, the response being directly related to the counter and emitted when it indicates that all the current blocks are executed;
e. when all the current blocks are executed, define new current blocks from the following block of each of the processes, and repeat steps c. and d. with these new current blocks.

BRIEF DESCRIPTION OF THE DRAWINGS

Other characteristics and advantages of the invention will emerge on examination of the detailed description hereafter and the appended drawings, wherein.

DETAILED DESCRIPTION

The drawings and the description hereafter essentially contain elements of a certain character. Therefore, they can be used, not only to better understand the present invention, but also to contribute to its definition, if applicable.

The Applicant has succeeded in overcoming the mentioned problems of the prior art and thus proposes a barrier of a physical or material nature. It will now be described with reference to FIG. 3, which proposes such a barrier of a physical or material nature. So, the computer device of FIG. 3 comprises a RAM (202), a processing unit capable of multi-process processing on various processors $PZ_1$ to $PZ_y$, (200), and a memory access manager COHER CACHE MGR (206) between said RAM (202) and the processors PZ (200).

Figure 4:
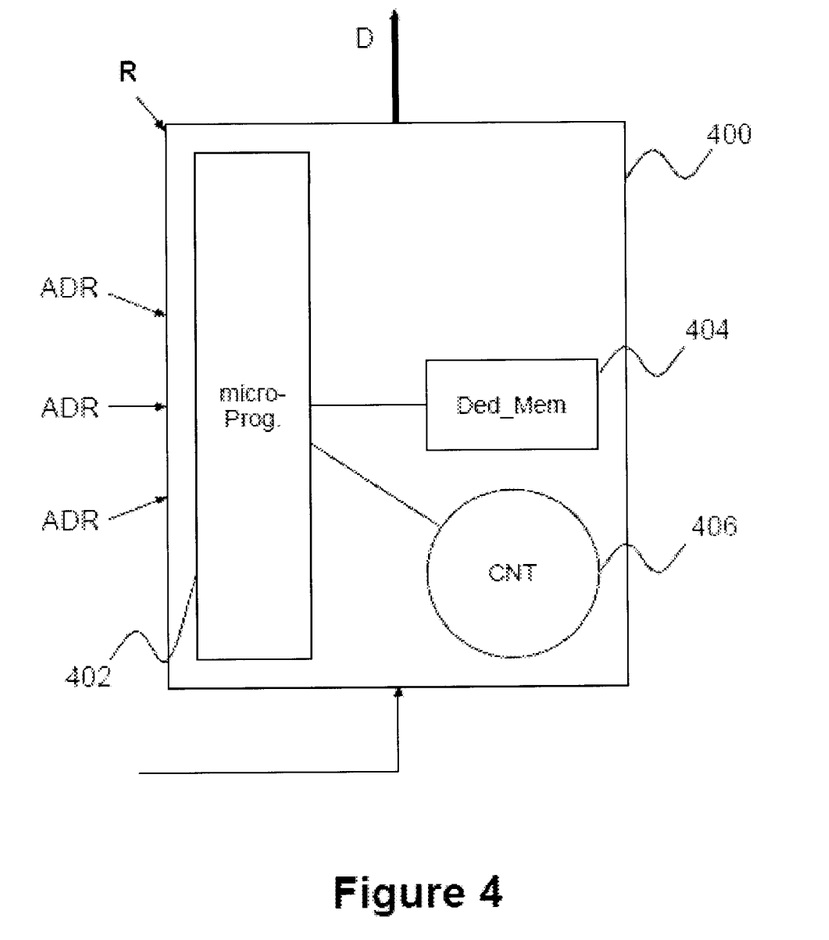
FIG. 4 represents a hardware circuit forming a synchronization barrier manager comprising a dedicated memory and a microprogram.

In the embodiment described here, the device further comprises a hardware circuit forming a synchronization barrier manager HBM (400), comprising a dedicated memory Ded_MEM (404) and a microprogram micro-Prog (402) such as represented on FIG. 4. At this stage, the manager HBM (400) only needs a data output "D (unidir)". In practice, this is an input/output in particular for reasons of compatibility (read/write R/W) with the connected bus.

In the described embodiment, the address/data links to the hardware circuit (HBM, 400) avoid the memory access manager COHER CACHE MGR (206).

In a general manner, the synchronization barrier manager HBM (400) will directly interact with the processes P which participate in the barrier BS (100). The interaction can be followed by a data storage in the dedicated memory Ded_MEM (404).

Figure 3:
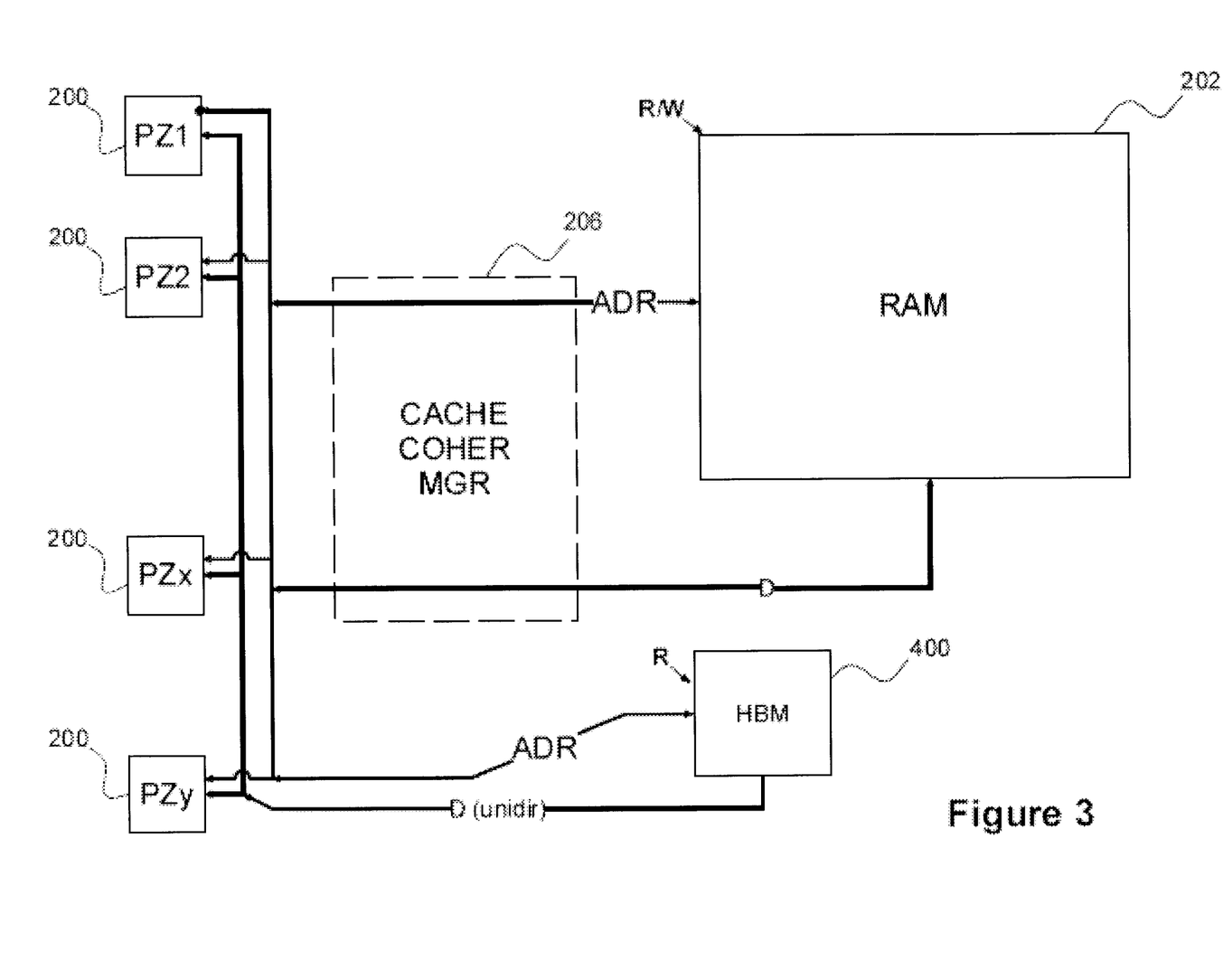
FIG. 3 represents a computer device comprising a memory and a processing unit, capable of multiprocess processing operations on various processors with a hardware circuit forming a synchronization barrier manager.

The synchronization barrier manager HBM (400) can for example be in a processor, in a chipset or other, or as represented on FIG. 3 within an additional component such as a hardware circuit. The manager HBM (400) must be accessible for any transaction originating from the processors P participating in the barrier BS (100) and targeting this manager. Therefore, the manager HBM (400) can be accessed or called by any request targeting its memory space. So, multiple addresses can target the same barrier BS (100) ("address aliasing").

In other words, each process P emitting a request to the synchronization barrier BS (100) carries:
  in the most significant bits of this request, the barrier address, and
  in the least significant bits, additional data.

Of course, it is possible to freely organize in the most significant or least significant bits (chosen bits) the location of the aforementioned information (address and data). So, the most significant bits of the request can carry said additional data and the least significant bits the address of the barrier.

An example of additional data can be the number of processes P participating in the barrier BS (100). So, each of the processes P can target a single and same barrier BS (100) by transmitting information necessary for the synchronization to it. This information can be stored by the microprogram micro-Prog (402) in its dedicated memory Ded_MEM (404) and then processed by the microprogram micro-Prog (402) of the synchronization barrier manager HBM (400).

By applying this principle, the synchronization barrier manager HBM (400) can manage several synchronization barriers BS (100) at a time. This possibility is important in some applications.

Now let us consider a group of n processes P which use for their synchronization a physical barrier. In a first step, the barrier BS (100) is in its initial state, and none of the n processes P accessed it. The processes P are in a first work step W and execute each their first blocks B (see FIG. 1). Similarly to what is described above, the first process P having finished its block B, informs the barrier BS (100) using a request. This request comprises on its least significant bits the number n of processes P participating in the barrier, which enables the initialization of a counter CNT (406) of the barrier BS (100) once the first request is received. The synchronization barrier BS (100) changes to the activated mode (or state) upon receiving this first request. After that, whenever a request targets the barrier BS (100), the synchronization barrier manager HBM (400) will decrement (countdown) the counter CNT (406). Requests are only responded to with data D when the synchronization barrier manager HBM (400) has received all the requests originating from the n processes P participating in the barrier BS (100). At that point, the synchronization is considered as effective. All the processes P are then authorized to transit to the next work step W.

Let's note that, once a block is finished, the corresponding process only interrogates once the barrier BS to determine the progress of the work step W. This is because the barrier BS is capable of storing in its own memory space Ded_MEM (404), the number of requests already received. Each process will remain pending until the response from the barrier BS is received. Therefore, a multiple interrogation (regular or not) of the processes to the barrier is not necessary Furthermore, each interrogation is less expensive in terms of bandwidth. This causes the bandwidth gain reached by the invention.

Incidentally, let us notice here that the time t for execution of a block B is not necessarily related to the arrival of the latter at the synchronization barrier BS. Indeed, for competition, non-scheduling of the communication channels, conflicts or arbitration reasons, a second request which left later than a first request can reach the BS barrier before said first request. However, this changes nothing to the barrier operation according to the invention. For simplicity reasons, we consider in this description that a request emitted by a first process having a shorter execution time t than a second process will join the barrier BS before the request emitted by the second process.

In an embodiment of the invention, the memory space of the synchronization barrier BS (100) is implemented in the memory space dedicated to the PCI bus of the computer.

In this example, what has been called "request" comes from a "load" instruction of the processor with an address of the PCI bus memory space. This request is a message on the system bus. This memory space enables a fast interaction between the processes P and/or request and the synchronization barrier BS (100).

If several barriers are required, it can be advantageous that the synchronization barrier manager manages these barriers in relation to memory segments, for example memory pages. This multiplicity of barriers can be connected to the same circuit or to separate circuits.

So, the PCI memory offers enough space to make provision for a predetermined size of memory page for each barrier while allowing to give a protected access between barriers.

For example, for 64-KB (kilobyte) pages, this enables the use of the 16 least significant bits of a request (call) to transmit data (particularly ADR); the synchronization barrier manager HBM (400) can therefore host M*64 KB pages, where M is the number of physical barriers BS (100) implemented in the synchronization barrier manager HBM (400). In particular, M can be 512, which ends up in a total memory space of 32 MB (megabytes). These 32 MB correspond of course to a memory of the virtual type which therefore must not be considered as "true" MB but are simply viewed as such by the application to be synchronized. Hereafter, an example of a request composition which can be used to have access to the memory (R [J . . . I]=bits of the request from 1 to J) is represented. This request comprises in particular the address of the barrier BS (100), a command being executed (detailed later), the indication whether this is a synchronization with one or several levels (detailed below) and the number of processes participating in the synchronization and therefore in the barrier.

| R[63...16] | R[15...9] | R[8...16] | R[7...0] |
|---|---|---|---|
| Address (ADR) of the barrier BS | Command | Synchronization level(s) Bit: 1 → 2 Levels 0 → 1 Level | Number of processes participating in the barrier |

In the bit R[8], the values 0 or 1 respectively correspond to a synchronization with one level and a synchronization with two levels. A higher synchronization level is detailed in the embodiment example below.

Figure 5:
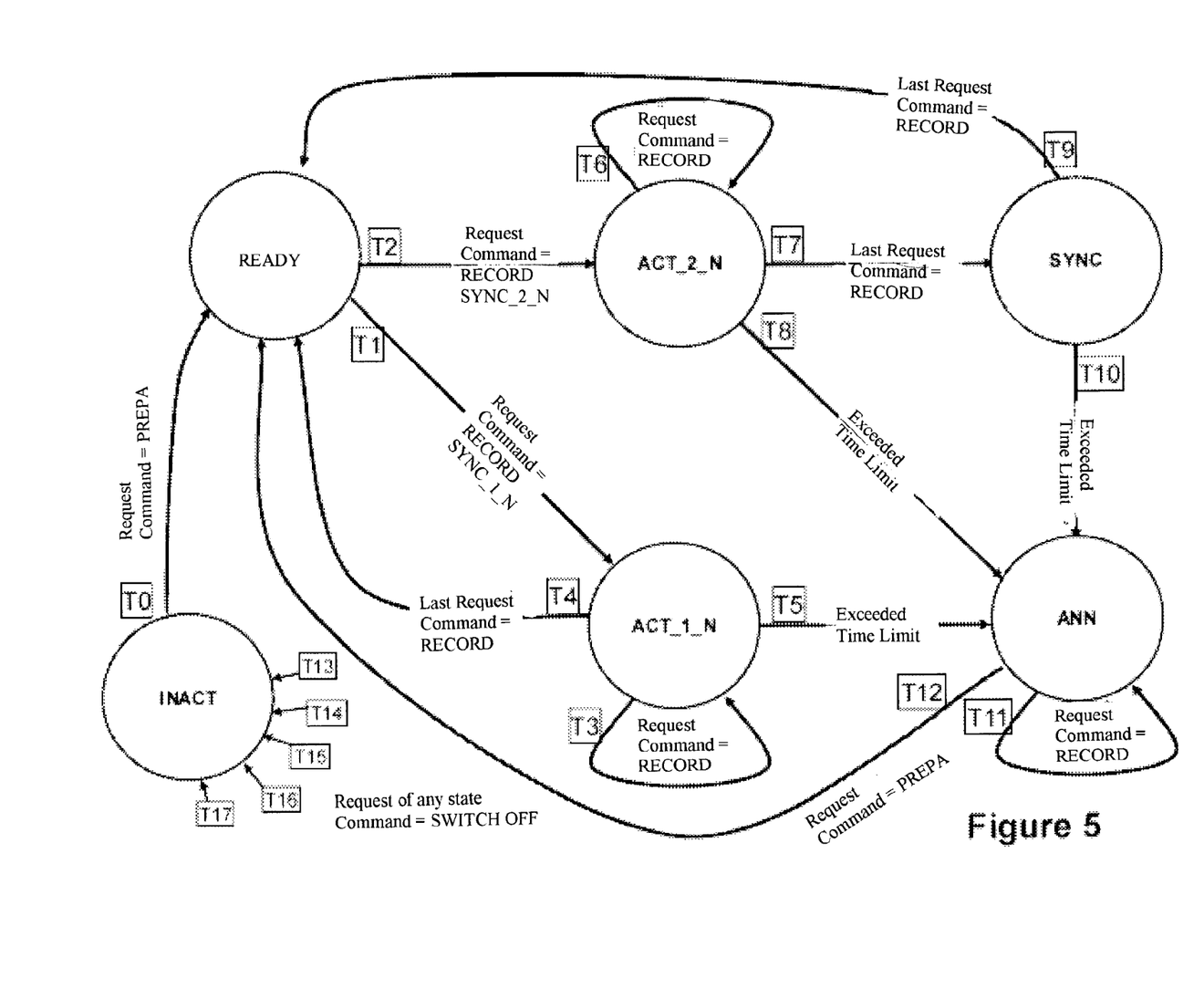
FIG. 5 represents a synchronization barrier automatic device according to an embodiment of the invention.

FIG. 5 is relative to an embodiment example of a synchronization manager HBM (400), which is capable of managing a higher level synchronization, and more precisely here with two levels. A two level synchronization can for example be used when several distinct groups of processes P must be synchronized with each of the groups having a physical (or material) barrier BS (100). In this case, the synchronization manager HBM (400) must manage the case where each group must be synchronized on its own, then all the groups must be synchronized between themselves.

The first request received by the barrier BS (100) in a PRE ready state, contains on its least significant bits information indicating whether this is a one or two level synchronization. If this is a one level synchronization, it will be managed by a one level barrier, or more precisely by an active state ACT of the barrier designed for one level (ACT_1_N state). If on the contrary this is a two level synchronization, the same barrier will enter an active state ACT designed for two levels (ACT_2_N state), in which case its behaviour will be such as described hereafter:

When all the requests have been received by the barrier BS (100), it chooses one of the processes P as being the master M among all the processes participating in the barrier BS (100). Initially, only the request of the master M will be responded by special data D indicating that it is the master of the group. From then on, the master is free to accomplish the second synchronization level. This second synchronization level can for example be a barrier BS (100) of a software nature. When the master M has ended this second synchronization level, it transmits a last request to the barrier BS (100). In response to this last request, the barrier responds to all the other requests originating from the other processes P participating in the barrier BS (100) (including the master M), and returns in the ready state PRE. The master M is dynamic and can be redefined at each synchronization.

EXAMPLE OF EMBODIMENT

The various states of the barrier automatic device represented on FIG. 5 are the following:
stand-by state INACT,
ready state READY,
active state with one level synchronization ACT_1_N,
active state with two level synchronization ACT_2_N,
synchronization state SYNC, and
cancellation state ANN.
Each state is detailed below.
Inact
The physical barrier is in the stand-by state and inactive. The single possible transition is transition T0. This transition corresponds to the receipt of the barrier of a request with a ready command READY called PREPA (command=PREPA to activate the barrier. The barrier changes to the ready state READY.

Ready

The physical barrier is ready to receive requests from the processes participating in the barrier.

According to the described embodiment, three transitions can take place: T1, T2 or T13. According to the request, the barrier will choose which transition to be performed.

Transition T1: This transition corresponds to the receipt of the barrier of a request containing a record command RECORD (command=RECORD) to initialize the barrier. The request comprises the information that a single level synchronization is needed (SYNC_1_N) in its least significant bits. The barrier is activated and then is in the active state with one level synchronization ACT_1_N.

Transition T2: Similarly to T1, this transition corresponds to the receipt of the barrier of a request with a record command RECORD to initialize the barrier. However, the request comprises the information that a two level synchronization is needed (SYNC_2_N) in its least significant bits. The barrier is activated and changes to the active state with two level synchronization ACT_2_N.

Transition T13: This transition corresponds to the receipt of the barrier of a request with a switch off command SWITCH OFF (command=SWITCH OFF) to inactivate the barrier and to change to the stand-by state INACT (see above).

ACT_1_N

The barrier performs a single level synchronization. Several transitions exist from this state.

Transition T3: This transition takes place whenever the barrier BS (100) receives a request from a process P with a record command RECORD (command=RECORD), and this before a predetermined time limit (detailed later). The internal counter CNT (406) is decremented at each transition T3 (CNT>threshold value). T3 more or less corresponds to each termination of the current blocks B, during the same work step W. The blocks B "pile up" (T3) at the level of the barrier BS (100), until the counter CNT (406) indicates that all the current blocks B have been executed (CNT=threshold value).

Transition T4: This transition takes place when the counter CNT (406) indicates that all the current blocks B have been executed: The barrier receives a last record command RECORD (command=RECORD) and the counter is decremented at its threshold value (CNT=threshold value). The requests originating from the processes P participating in the barrier BS (100) are responded to. The response indicates the synchronization success. The barrier BS (100) returns to the ready state READY.

Transition T5: the counter must reach its threshold value before a predetermined time limit. The choice of the time limit threshold is variable and is made according to the application. If this predetermined time limit is exceeded, the transition T5 enables the cancellation of the synchronization. With optionally return of an error message or time limit increase order for example. The time limit can be prerecorded on a control unit with a time counter ("chronic counter) capable of performing a countdown in time units (for example μs).

Transition T14: This transition corresponds to the receipt of the barrier of a request with a switch off command SWITCH OFF (command=SWITCH OFF) to inactivate the barrier and to change to the stand-by state INACT.

ACT_2_N

The barrier performs a two level synchronization. Several transitions exist from this state.

Transition T6: analogous to transition T3 (see above).

Transition T7: to begin with, the transition T7 is analogous to T4. Indeed, T7 takes place when the counter CNT (406) indicates that all the current blocks B have been executed: The barrier receives a last record command RECORD (command=RECORD) and the counter is more decremented and reaches its threshold value (CNT=threshold value). Unlike the transition T4, here all the requests from the processes P are not responded to, but only one of them. The response consists in electing any of the processes P as the master M. The barrier then proceeds to the synchronization state SYNC (detailed later). During T7, the predetermined time limit is reinitialized.

Transition T8: analogous to transition T5 (see above).

Transition T15: analogous to transition T13 (see above).

Sync

Three possible transitions:

Transition T9: the master M receives a request with a record command RECORD (command=RECORD), before the predetermined time limit (with: CNT=threshold value). All the processes P are responded to. The response indicates the synchronization success. The barrier BS (100) returns to the ready state PRE.

Transition T10: analogous to transition T5 (see above).

Transition T16: analogous to transition T13 (see above).

Ann

To set an optimum time (maximum acceptable) for the accomplishment of a synchronization, the barrier BS (100) is fitted with a time counter, also called chronic-counter. The counter is configurable and can describe a time limit. The counter starts a countdown (generally in µs units) upon receiving the first request. The time then starts. If the predetermined time limit is exceeded before receiving the last request at the barrier BS (100), then it transits to the cancellation state ANN.

The time limit can vary according to the barriers, and more precisely according to the various states of a barrier, in particular: ACT_1_N, ACT_2_N, SYNC.

In other words, if the barrier BS (100) enters the cancellation state ANN, this is due to the fact that the time limit has been exceeded in the preceding state, before receiving all the requests. Then the barrier responds to the requests already received, with a synchronization failure message.

In practice, this time limit is programmable. Its upper limit can be set according to the context, in particular to avoid interference with the "time-outs" of the processor.

Three transitions exist in the cancellation state ANN:

Transition T11: A request is received with a record command RECORD" (command=RECORD). In which case the requests are responded to with an error message such as described above.

Transition T12: A request is received with a command indicating the return to the ready state READY (command=PREPA). The barrier returns to the ready state PRE (see above). This, for example, invites all the processes (P) to go back to the end of execution by an earlier work step (W).

Transition T17: analogous to transition T13 (see above).

Figure 6:
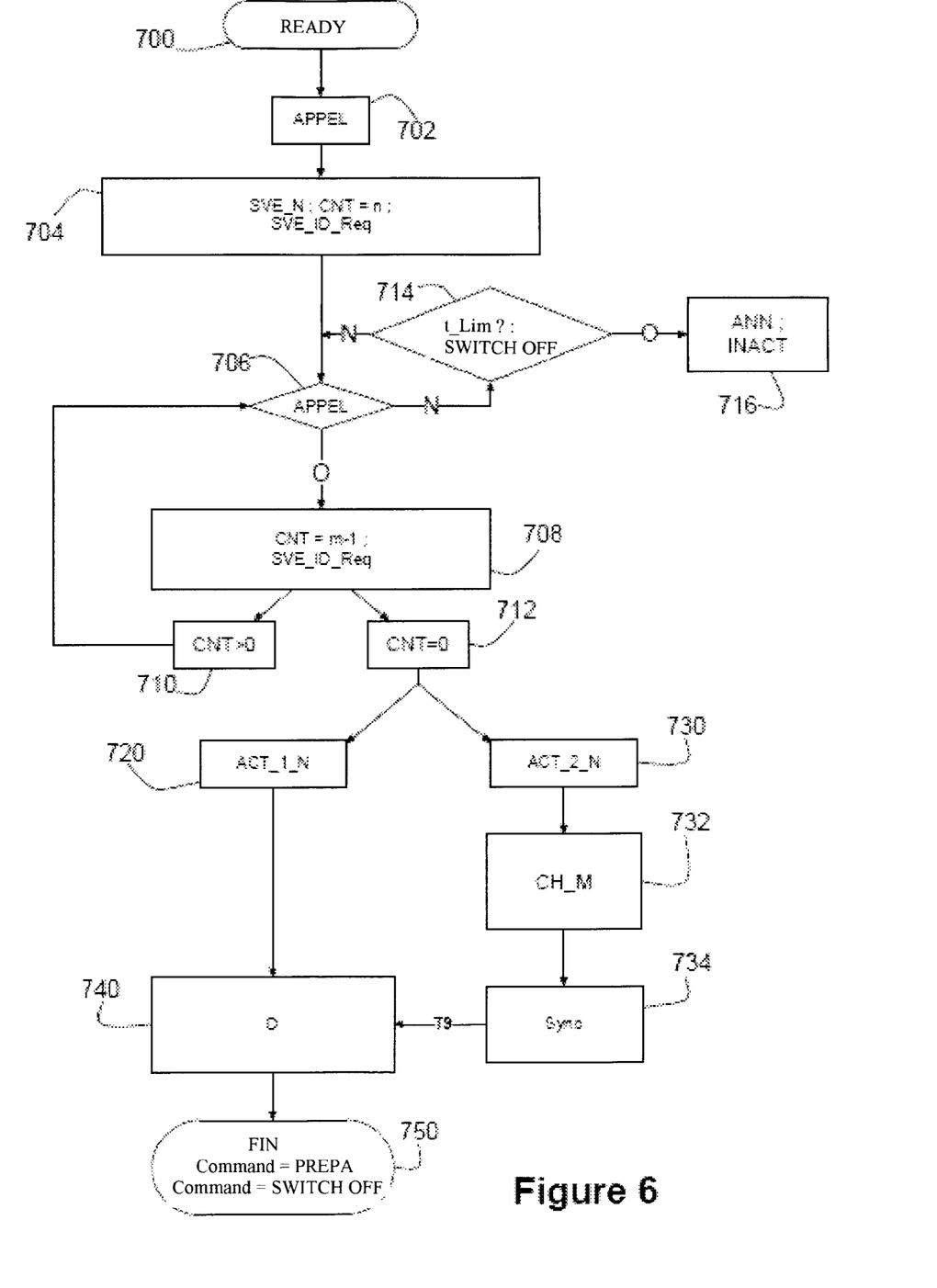
FIG. 6 represents a flow diagram of the main operations according to an embodiment of the invention.

The flow chart of FIG. 6 summarizes the main operations of a synchronization barrier BS according to an embodiment of the invention. The flow chart shows the barrier BS (100) in its ready state PRE (operation 700). The first process P having finished its block B informs (by a call) the barrier BS (100) using a request targeting the manager HBM (400) (operation 702). The request comprises information on the synchronization level or levels (command=RECORD for ACT_1_N or ACT_2_N for example). The counter CNT (406) is initialized (generally to n=number of processes P) and the barrier BS (100) stores an identifier SVE_ID_Req corresponding to said first process P, on the one hand, and information on the synchronization level or levels SVE_N (operation 704), on the other hand. From then on, the activated barrier BS (100) waits for the next calls of the other processes P (operation 706). If the predetermined time limit is exceeded or if the barrier BS (100) receives a request with a switch off command (command=SWITCH OFF) (operation 714), the barrier respectively changes to the cancellation ANN or stand-by INACT state (operation 716). However, if another process P informs the barrier of the termination of its current block (without exceeding the time limit t_Lim, and without a command=SWITCH OFF), the counter CNT (406) is decremented (operation 708, with m=number of processes not having terminated their block B as yet during the work step W in progress). At the same time as the decrementation, the barrier stores the identifier SVE_ID_Req corresponding to the process P having recently informed the barrier BS (100) (operation 708). The barrier BS (100) then verifies whether the counter CNT (406) has reached its threshold value (operations 710 and 712). If not, (operation 710; CNT>0) the barrier returns to the wait state (operation 706); If yes (operation 712; CNT=0), the barrier progresses to perform the synchronization (according to the level set at operation 704). After a synchronization having been set to a level (operation 720; ACT_1_N), the barrier responds to each process P with data D, comprising for example a progress command to a next work step W, (operation 740). When the synchronization level has been set to two levels (operation 730; ACT_1_N), i.e. for example for several groups of processes P (see above), the barrier BS (100) elects a master M among the processes P in progress (operation 732; CH_M) and performs a second synchronization (operation 734; SYNC) before the response with data D (operation 740). The synchronization terminates (operation 750) with the return to the ready state READY (command=PREPA) or with an inactivation of the barrier (command=SWITCH OFF).

Of course, the invention is not limited to the embodiments described above but encompasses all the embodiments that those skilled in the art can envisage within the framework of the appended claims.

So, in the described embodiment, a single barrier BS is used for the synchronization of the processes. It may be useful to integrate into a computer system several synchronization barriers BS and in particular to make it possible to synchronize several groups of processes, each group contributing to executing a different task. For example, in scientific computation on a 16-core machine, we can envisage that 2 independent computations are performed by using each 8 cores, then we will have 2 groups of 8 processes, each process being executed on a different core. In this example, we will need 2 barriers.

When several synchronization barriers BS are used, they can of course be implemented in the same component or in different components. Indeed, the device can comprise several hardware circuits, the address spaces of which are accessed by segments drawn from said data of each call. In this case, we can specify that each of the hardware circuits is connected either to the same circuit, or to separate circuits.

It is also noted that a mixture between barriers of the software type and barriers according to the invention, namely with a hardware circuit, can be easily envisaged. Therefore, the computer device described here can further comprise a software synchronization barrier working in combination with said hardware circuit.

The invention claimed is:

1. A computer device with a synchronization barrier, comprising:
   a processing unit configured to perform multiprocess processing on various processors and to enable parallel execution of blocks by a plurality of processes, said blocks being associated by groups in successive work steps;
   a random-access memory with an address space accessible by any call sent by any of said plurality of processes, wherein said random-access memory is coupled to a memory access manager; and
   a hardware circuit with a memory and having an address space accessible by any call sent by any of said plurality of processes,
   wherein said address space of said hardware circuit is different from the address space of the random-access memory,
   wherein said synchronization barrier includes a counter related to a number of processes, and wherein said synchronization barrier is implemented in said hardware circuit and is configured to
      define a first block of said blocks in a current work step as a current block and executing said first block by a process;
      receive a call from each process of the plurality of processes indicating an end of execution of a block for all blocks in the current work step in progress and accessing said synchronization barrier to decrement said counter for each said call, each said call comprising data; and
      authorize the execution of blocks of a later work step when all the blocks of the current work step have been executed, and
   wherein said data of each said call includes first bits which carry an address of said synchronization barrier in said address space of the hardware circuit, and second bits which carry additional data indicating a number of processes which can access said synchronization barrier; and
   wherein said calls to the hardware circuit are direct without requiring access to the memory access manager.

2. The computer device according to claim 1, wherein the hardware circuit comprises a microprogrammed device configured to perform processing based on said data of at least one call.

3. The computer device according to claim 2, wherein the memory further comprises a dedicated memory coupled to said microprogrammed device.

4. The computer device according to claim 1, wherein the hardware circuit is configured to perform suspension of responses to each call, until an end condition indicating that all processes have signalled the end of execution of the block of the current work step is verified.

5. The computer device according to claim 1, wherein the hardware circuit is arranged to respond to each call with a data output and to authorize the processes to transition to the later work step when all processes have signalled the end of execution of the block of the current work step.

6. The computer device according to claim 1, wherein all calls are of the same type defined by the data of each call.

7. The computer device according to claim 1, wherein the computer device further comprises several hardware circuits, the address spaces of which are accessed by segments drawn from said data of each call.

8. The computer device according to claim 7, wherein each of said hardware circuits is connected to the same circuit.

9. The computer device according to claim 7, wherein each of said hardware circuits is connected to a separate circuit.

10. The computer device according to claim 1, wherein the computer device further comprises a software synchronization barrier working in combination with said hardware circuit.

11. The computer device according to claim 1, wherein said synchronization barrier is configured to
    extract the number of processes from a first call;
    perform a countdown on said number of processes from other calls;
    authorize the execution of blocks of a later work step when the countdown indicates, before a time limit has been reached, that all blocks of a current work step have been executed; and
    cancel synchronisation if the time limit has been exceeded.

12. The computer device according to claim 11, wherein the time limit is programmable.

13. A method at the process level, the method comprising the following steps:
   a. breaking down a task into sub-tasks executed as processes composed of successive blocks;
   b. providing a synchronization barrier including a counter related to a number of processes, wherein said synchronization barrier is included in a barrier physical manager implemented in a hardware circuit with a memory and having an address space accessible by any call sent by said processes, wherein said address space of said hardware circuit is different from an address space of a random-access memory also accessible by any call sent by said processes, wherein said random-access memory is coupled to a memory access manager;
   c. in each process, defining a first block as a current block and executing said first block, while accessing said synchronization barrier to decrement said counter when the execution of said current block terminates, wherein said synchronization barrier is accessed by including, in each said call, first bits which include an address of said synchronization barrier in said address space of the hardware circuit, and second bits which include additional data indicating a number of processes which can access said synchronization barrier;
   d. in each process where the execution of the current block is terminated, waiting for a response of said synchronization barrier, the response being directly related to the counter, and emitting said response when all current blocks are executed, wherein said response indicates that all the current blocks are executed; and
   e. when all the current blocks are executed, defining new current blocks from a following block of each of the processes, and
   repeating steps c. to d. using said new current blocks; and
   wherein said calls to the hardware circuit are direct without requiring access to the memory access manager.

14. The method according to claim 13, further comprising, between steps c. and d.:
- a step of c(1). in the synchronization barrier
    - extracting the number of processes from a first call;
    - initializing the counter from said number of processes;
    - performing a countdown on said number of processes from other calls;
    - authorizing the execution of blocks of a later work step when the countdown indicates, before a time limit has been reached, that all blocks of a current work step have been executed; and
    - cancelling synchronisation if the time limit has been exceeded.

15. The method according to claim 14, wherein the time limit is programmable.

* * * * *